(12) United States Patent
Chen

(10) Patent No.: US 12,101,654 B2
(45) Date of Patent: *Sep. 24, 2024

(54) MEASUREMENT METHOD, USER EQUIPMENT, AND NETWORK SIDE DEVICE

(71) Applicant: VIVO MOBILE COMMUNICATION CO.,LTD., Guangdong (CN)

(72) Inventor: Li Chen, Chang'an Dongguan (CN)

(73) Assignee: VIVO MOBILE COMMUNICATION CO., LTD, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,617

(22) Filed: Jan. 3, 2022

(65) Prior Publication Data

US 2022/0124528 A1  Apr. 21, 2022

Related U.S. Application Data

(63) Continuation of application No. 16/634,105, filed as application No. PCT/CN2018/093986 on Jul. 2, 2018, now Pat. No. 11,252,588.

(30) Foreign Application Priority Data

Jul. 27, 2017  (CN) .......................... 201710625105.X

(51) Int. Cl.
*H04W 24/08* (2009.01)
*H04W 36/00* (2009.01)

(52) U.S. Cl.
CPC ..... *H04W 24/08* (2013.01); *H04W 36/00835* (2018.08); *H04W 36/0085* (2018.08)

(58) Field of Classification Search
None
See application file for complete search history.

(56) References Cited

U.S. PATENT DOCUMENTS

| 11,252,588 B2* | 2/2022 | Chen ............... H04W 36/00835 |
| 2010/0041412 A1 | 2/2010 | Yu |
| 2014/0295770 A1 | 10/2014 | Song et al. |
| 2015/0282030 A1* | 10/2015 | Vrind ............... H04W 36/0061 370/311 |
| 2017/0055192 A1* | 2/2017 | Johansson ............. H04W 36/30 |

(Continued)

FOREIGN PATENT DOCUMENTS

| CN | 101299860 A | 11/2008 |
| CN | 102547881 A | 7/2012 |

(Continued)

OTHER PUBLICATIONS

CN Office Action in Application No. 201710625105.X dated Aug. 17, 2020.

(Continued)

*Primary Examiner* — Saad Khawar
(74) *Attorney, Agent, or Firm* — Brooks Kushman, P.C.

(57) ABSTRACT

A measurement method, a user equipment and a network side device are provided. The measurement method performed by the user equipment includes: determining a first measurement parameter; determining whether a measurement triggering condition is met; and performing measurement on at least one of a neighboring cell of the UE or a serving cell of the UE based on the first measurement parameter, in a case that the measurement triggering condition is met.

12 Claims, 5 Drawing Sheets

(56) References Cited

U.S. PATENT DOCUMENTS

| | | | |
|---|---|---|---|
| 2018/0132125 A1* | 5/2018 | Li | ............... H04W 24/10 |
| 2018/0146410 A1 | 5/2018 | Cho et al. | |

FOREIGN PATENT DOCUMENTS

| | | | |
|---|---|---|---|
| CN | 102572989 A | 7/2012 |
| CN | 102917380 A | 2/2013 |
| CN | 103167551 A | 6/2013 |
| CN | 103501511 A | 1/2014 |
| CN | 105493551 A | 4/2016 |
| CN | 105517074 A | 4/2016 |
| CN | 106231626 A | 12/2016 |
| CN | 107438270 A | 12/2017 |
| EP | 2 472 955 A1 | 7/2012 |
| WO | 2012/034583 A1 | 3/2012 |
| WO | 2016/090609 A1 | 6/2016 |
| WO | 2016/178440 A1 | 11/2016 |

OTHER PUBLICATIONS

European Search Report in Application No. 18838739.3 dated Jun. 30, 2020.
CN Office Action in Application No. 201710625105.X dated Feb. 3, 2020.
CN Search Report in Application No. 201710625105.X dated Apr. 24, 2019.
"Idle measurement enhancement using UE Speed", 3GPP TSG-RAN WG2 Meeting NR AH#2, Jun. 27, 2017.
Written Opinion and International Search Report in Application No. PCT/CN2018/093986 dated Jul. 2, 2018.
Chinese Office Action dated as Feb. 3, 2020 received in application No. 201710625105.X.
Chinese Decision of Rejection dated Aug. 17, 2020 as received in application No. 201710625105.X.
European Search Report dated Jun. 30, 2020 as received in application No. 18838739.3.
"Idle measurement enhancement using UE speed" 3GPP TSG-RAN WG2 Meeting NR AH#2, R2-1706933, Jun. 27, 2017, LG Electronics Inc.
International Search Report and Written Opinion dated Feb. 6, 2020 as received in application No. PCT/CN2018/093986.
Non-final Office Action dated Jul. 15, 2021 as received in U.S. Appl. No. 16/634,105.
Chinese Search Report dated Apr. 24, 2019 as received in application No. 201710625105.X.

\* cited by examiner

MEASUREMENT METHOD, USER EQUIPMENT, AND NETWORK SIDE DEVICE

CROSS-REFERENCE TO RELATED APPLICATION

This application is a continuation application of U.S. patent application Ser. No. 16/634,105 filed on Jan. 24, 2020, which is the U.S. national phase of PCT Application No. PCT/CN2018/093986 filed on Jul. 2, 2018, and claims a priority to Chinese Patent Application No. 201710625105.X filed on Jul. 27, 2017. All of the disclosures are incorporated in their entirety by reference herein.

TECHNICAL FIELD

The present disclosure relates to the field of communication technology, and in particular to a measurement method, a user equipment and a network side device.

BACKGROUND

For each of a stationary user equipment (abbreviated as UE), a UE at a low mobility, and a UE at a high mobility, the UE in an idle mode triggers a cell measurement in accordance with a uniform condition. No differentiated configurations are provided for a mobility state of the UE, an environment where the UE is located, or a coverage, which is adverse to power saving of some UEs in a stationary state or at a very low mobility, in a case that there is a small change in a channel environment.

SUMMARY

A measurement method, a user equipment and a network side device are provided according to the present disclosure. The measurement method, the user equipment and the network side device according to the present disclosure can solve the problem of negative effect to power saving of a UE caused by the fact that the UE in an idle mode triggers a cell measurement in accordance with a uniform condition.

In a first aspect, a measurement method is provided according to the present disclosure, and the measurement method is applicable to a user equipment (UE) and includes: determining a first measurement parameter and whether a measurement triggering condition is met; and performing, in a case that the measurement triggering condition is met, measurement on at least one of a neighboring cell of the UE or a serving cell of the UE based on the first measurement parameter.

In a second aspect, a measurement method is further provided according to the present disclosure, and the measurement method is applicable to a network side device and includes: broadcasting whether the network side supports a condition of performing measurement triggering based on a state of a UE.

In a third aspect, a user equipment (UE) is further provided according to the present disclosure, the UE including: a first determination module, configured to determine a first measurement parameter; a second determination module, configured to determine whether a measurement triggering condition is met; and a measurement module, configured to perform, in a case that the measurement triggering condition is met, measurement on at least one of a neighboring cell of the UE or a serving cell of the UE.

In a third aspect, a network side device is further provided according to the present disclosure, the network side device including: a broadcast module, configure to broadcast whether a network side supports a condition of performing measurement triggering based on a state of a UE.

In a fourth aspect, a user equipment is further provided according to the present disclosure, which includes: a processor, a memory and a measurement program stored on the memory and executable by the processor, and when the measurement program is executed by the processor, the steps of the measurement method in the first aspect are performed by the processor.

In a fifth aspect, a network side device is further provided according to the present disclosure, the network side device including: a processor, a memory and a measurement program stored on the memory and executable by the processor, and when the measurement program is executed by the processor, the steps of the measurement method in the second aspect are performed.

In a sixth aspect, a computer readable storage medium is further provided according to the present disclosure, the computer readable storage medium including a measurement program stored thereon, and when the measurement program is executed by a processor, the steps of the measurement method in the first or second aspect above are performed by the processor.

In this way, the UE determines the first measurement parameter and whether the measurement triggering condition is met, and performs, in a case that the measurement triggering condition is met, measurement on the neighboring cell and/or the serving cell of the UE. As the first measurement parameter and/or the measurement triggering condition may be directly configured by a network side or may be selected by the UE based on a state thereof, measurement can be triggered in different manners for the UE in different states, and further, measurement in power saving mode can be configured for the UE that is stationary or at a low mobility, thereby achieving the object of power saving.

BRIEF DESCRIPTION OF THE DRAWINGS

Various other advantages and benefits will become apparent to those skilled in the art by reading detailed description of optional embodiments hereinafter.

The drawings are only for the purpose of illustrating optional embodiments and are not construed as limiting the present disclosure. Throughout the drawings, the same components are denoted by the same reference signs. In the drawings.

DETAILED DESCRIPTION

Figure 1:
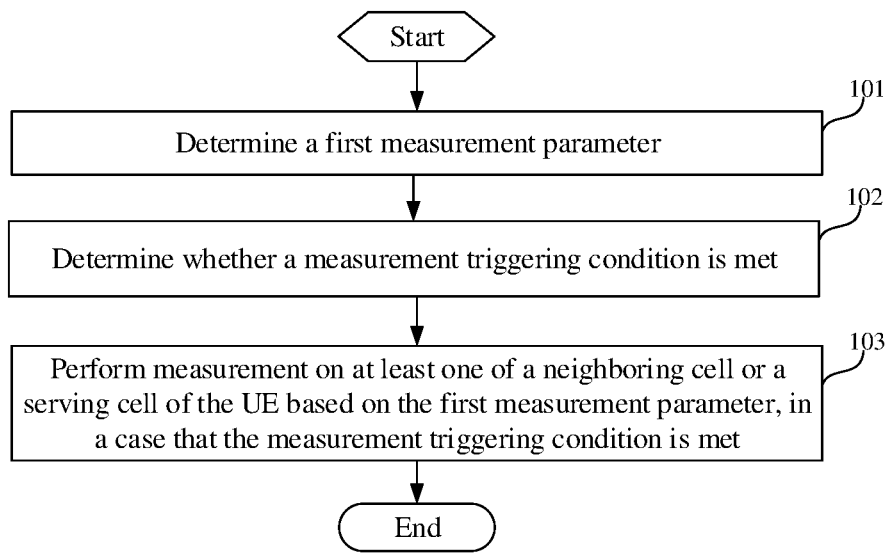
FIG. 1 is a flowchart of a measurement method on a user equipment side according to some embodiments of the present disclosure.

To better clarify objects, technical solutions and advantages of the present disclosure, detailed descriptions of the present disclosure are further provided in conjunction with the drawings hereinafter. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

The terms "include" and "have" and any variations thereof in the specification and claims of the present disclosure are intended to cover non-exclusive inclusion. For example, a process, method, system, product, or device including a series of steps or units is not limited to those steps or units that are explicitly listed, but may optionally include other steps or units that are not explicitly listed or that are inherent in the process, method, product, or device.

With the development of intelligent terminals, there are more and more sensors on a user equipment (UE) and the user equipment is getting more and more intelligent. In many situations and scenarios, the UE can accurately know whether it is in a mobility state, a mobility speed, and related mobility information. In addition, the UE carries more sensors to obtain information such a mobility state of the UE, environmental information, or coverage information, and then performs more controls and more optimizations on the behavior of the UE based on the information, such as optimizations performed on measurement of the UE in an idle mode and in an inactive mode, thereby saving power.

A network may configure multiple sets of measurement parameters for this type of UE. The UE selects different measurement parameters to trigger cell measurements in an idle and in an inactive mode according to a state of the UE, so that different UEs may select different parameters based on their own states to perform cell measurements. For a scenario where the states of some UEs do not change frequently, measurements in idle mode and inactive mode can be saved, thereby achieving the object of power saving. When normal measurement parameters are needed in a case that a mobility state of the UE, an environment where the UE is located, or coverage information changes, or in a case that a sensor of the UE detects other related changes, the UE recovers the normal measurement parameters.

The measurement methods and the user equipment according to some embodiments of the present disclosure optimize and redesign measurements in idle mode and inactive mode, so that power saving can be achieved for a stationary UE or a UE at a low mobility.

In a long-term evolution (LTE) system, the technical specification (TS) 36.304 about an idle-mode protocol of 3GPP defines configurations related to idle mode measurement and triggering conditions of measurement on neighboring cell.

In determining whether to perform measurement on an intra-frequency neighboring cell for a cell selection or re-selection purpose, when a serving cell meets a condition that Srxlev (reception level value for cell selection)>SIntraSearchP and Squal (quality value for cell selection)>SIntraSearchQ, the UE chooses not to perform measurement on the intra-frequency neighboring cell; otherwise, when they are smaller than the thresholds, the measurement needs to be performed on the intra-frequency neighboring cell, where the parameters SIntraSearchP and SIntraSearchQ are the thresholds for starting measurement on the intra-frequency neighboring cell.

For inter-frequency and inter-RAT (inter-system) scenarios, in a case that a priority thereof is higher than that of a current serving frequency point and RAT (Radio Access Technologies), the UE performs measurement on a neighboring cell according to measurement requirements defined in TS 36.133. In a case that the priority is equal to or lower than that of the current serving frequency and RAT, when the serving cell meets that: Srxlev>$S_{nonIntraSearchP}$ and Squal>$S_{nonIntrasearchQ}$, the UE chooses not to perform measurement on a neighboring cell; otherwise, when they are smaller than the thresholds, measurement needs to be performed on a neighboring cell, where $S_{nonIntraSearchP}$ and $S_{nonIntraSearchQ}$ represent thresholds for starting inter-frequency/inter-RAT measurement.

In some embodiments of the present disclosure, the network side may refer to a base station, and the base station may be a base station (Base Transceiver Station, BTS) in a global system of mobile communication (GSM) or in code division multiple access (CDMA), a base station (NodeB, NB) in wideband code division multiple access (WCDMA), an evolutional base station (Evolutional Node B, eNB, or eNodeB) in LTE, a base station in new radio access technical (New RAT or NR), a relay station or access point, or a base station in future 5G network, which is not limited herein.

In some embodiments of the present disclosure, the user equipment (UE) may be a wireless terminal or a wired terminal. The wireless terminal may refer to a device configured to provide voice and/or other service data connectivity to a user, a handheld device with a wireless connection function, or any other processing device connected to a wireless modem. The wireless terminal may communicate with one or more core networks via a radio access network (RAN). The wireless terminal may be a mobile terminal, such as a mobile phone (or a cellular phone) or a computer equipped with a mobile terminal. For example, the wireless terminal may be a portable, pocket-sized, handheld, computer-built-in or vehicle-mounted mobile device, which exchanges voice and/or data with a radio access network. For example, it may be a personal communication service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, a user device or equipment, which is not limited herein.

Referring to FIG. 1, FIG. 1 shows a flowchart of a measurement method according to some embodiments of the present disclosure. The method is performed by a UE and includes steps 101 to 103.

In step 101, a first measurement parameter is determined.

In step 102, whether a measurement triggering condition is met is determined.

In some embodiments of the present disclosure, at least one of the first measurement parameter or the measurement triggering condition may be directly configured by a network side or selected by the UE based on a state of the UE.

For example, at least one of the first measurement parameter or the measurement triggering condition is determined by the UE based on the state of the UE. Optionally, the network side (for example, a base station) configures at least two different first measurement parameters for the UE in idle mode or inactive mode, and the UE in different states selects different first measurement parameters to perform measurement on a neighboring cell; or the network side configures a relevant measurement parameter for the UE in idle mode or inactive mode, the UE in different states choose to add different offsets, and the first measurement parameter is obtained based on the relevant measurement parameter and the offset; or, the UE determines the triggering condition based on a state of the UE.

It should be noted that the sequence of steps 101 and 102 are not limited in some embodiments of the present disclosure.

In step 103, measurement on at least one of a neighboring cell of the UE or a serving cell of the UE is performed based on the first measurement parameter, in a case that the measurement triggering condition is met.

It should be noted that the serving cell may be a camped cell or a connected-mode serving cell. The camped cell refers to a cell on which the UE in an idle or inactive mode camps, while the connected-mode serving cell refers to a cell to which the UE in a connected mode is connected.

In some embodiments of the present disclosure, as the first measurement parameter and/or the measurement triggering condition may be directly configured by the network side or selected by the UE based on the state of the UE, measurement may be triggered in different manners for the UE in different states, and further, measurement in power saving mode may be configured for the UE that is stationary or at a low mobility, thereby achieving the purpose of power saving.

Figure 2:
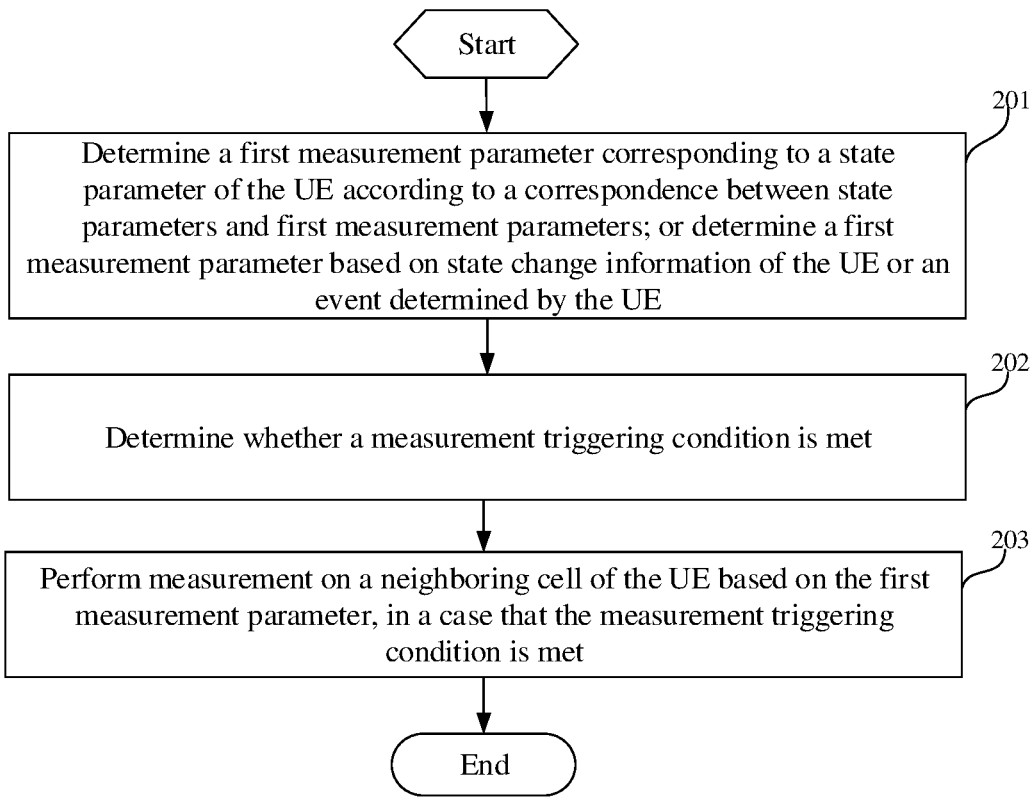
FIG. 2 is another flowchart of a measurement method on a user equipment side according to some embodiments of the present disclosure.

Referring to FIG. 2, FIG. 2 is a flowchart of a measurement method according to some embodiments of the present disclosure. The method is performed by a UE. In some embodiments of the present disclosure, a network side configures at least two different first measurement parameters for the UE in idle mode or inactive mode, and the UE selects a different first measurement parameter based on a state of the UE or an event, to perform measurement on a neighboring cell. The method shown in FIG. 2 includes steps 201 to 203.

In step 201, a first measurement parameter corresponding to a state parameter of the UE is determined according to a correspondence between state parameters and first measurement parameters; or the first measurement parameter is determined based on state change information of the UE or an event determined by the UE.

In step 201, a static manner may be adopted, and the UE may select based on a state of the UE or pre-define based on a state of the UE, the first measurement parameter. Or, in step 201, a dynamic manner may be adopted, and the UE may select the first measurement parameter based on state change of the UE or based on an event, where the event may be too late or too early cell re-selection.

The first measurement parameter includes any one or more of the following: an intra-frequency neighboring cell measurement starting threshold (for example, SIntraSearchP/SIntraSearchQ), an inter-frequency or inter-RAT measurement starting threshold ($S_{nonIntraSearchP}$/$S_{nonIntraSearchQ}$), or a first offset (offset) for determining whether the measurement triggering condition is met, which is not limited herein.

Optionally, the first measurement parameters are configured for the UE by a network side via a radio resource control (RRC) message or a system message, and then the UE selects a corresponding first measurement parameter based on the state of the UE.

The above state parameter of the UE includes any one or more of the following: a type of the UE, a movement of the UE, a maximum movement speed of the UE, a current mobility state of the UE, a current service state of the UE, a state of a network on which the UE currently camps, or a channel state of the UE, which is not limited herein.

In step 202, whether a measurement triggering condition is met is determined.

In some embodiments of the present disclosure, the above measurement triggering condition may be a relevant measurement triggering condition, which is not described in detail herein.

In step 203, measurement on a neighboring cell of the UE is performed based on the first measurement parameter, in a case that the measurement triggering condition is met.

In some embodiments of the present disclosure, the network side may explicitly broadcast whether the network side supports a condition of performing measurement triggering based on the state of the UE, or the network side may implicitly broadcast whether the network side supports the condition of performing measurement triggering based on the state of the UE. For example, the network side broadcasting the first measurement parameter is equivalent to that the network side implicitly broadcasts whether the network side supports the condition of performing measurement triggering based on the state of the UE.

Optionally, in some embodiments of the present disclosure, the method further includes: explicitly or implicitly obtaining a notification from the network side of whether the network side supports a second behavioral capability of performing measurement triggering based on the state of the UE.

Further, in a case of cell selection or re-selection, the method further includes: adding a second offset for a cell supporting the second behavioral capability, or increasing a priority of a cell supporting the second behavioral capability. For example, in a case that a cell supports the second behavioral capability, an offset is added for S-criteria of cell selection, and an offset is added for R-criteria of cell re-selection in cell ranking; and in a case that another frequency point supports the second behavioral capability, a priority of a frequency point which can be supported by broadcast is increased in cell selection and re-selection.

A reverse third offset is added for a cell that does not support the second behavioral capability, or a priority of a cell or frequency point that does not support the second behavioral capability is decreased.

In some embodiments of the present disclosure, the first measurement parameter may be configured by the network side and selected by the UE based on the state thereof, so that measurement may be triggered in different manners for the UE in different states, and further, measurement in power saving mode may be configured for the UE that is stationary or at a low mobility, thereby achieving the purpose of power saving.

Figure 3:
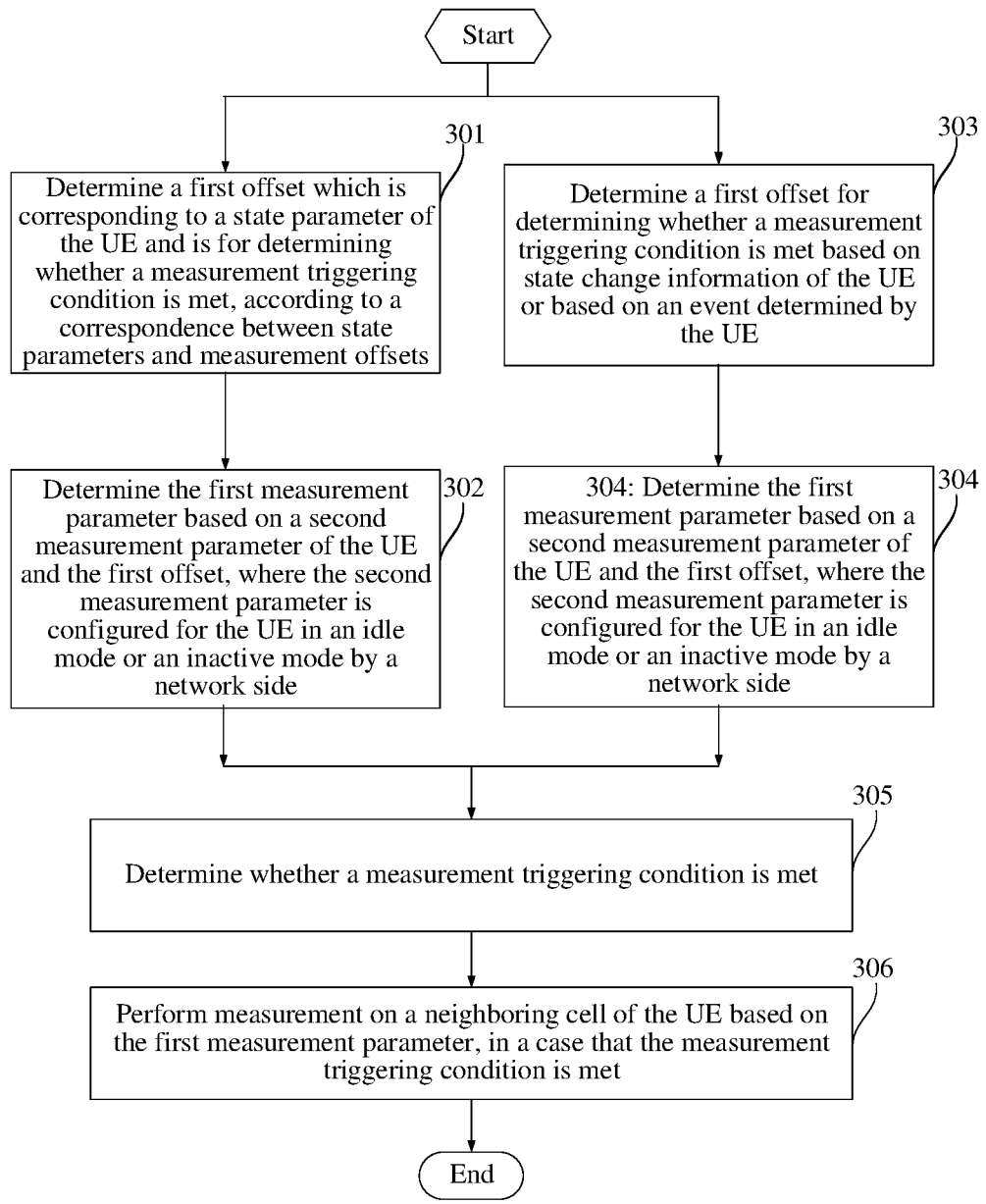
FIG. 3 is another flowchart of a measurement method on a user equipment side according to some embodiments of the present disclosure.

Referring to FIG. 3, FIG. 3 is a flowchart of a measurement method according to some embodiments of the present disclosure. The method is performed by a UE. In some embodiments of the present disclosure, a network side configures a relevant measurement parameter for a UE in idle mode or inactive mode; and the UE chooses to add a different offset based on a state of the UE, determines a first measurement parameter based on the relevant measurement parameter and the offset, and performs measurement on a neighboring cell based on the first measurement parameter. The method includes steps 301 to 306.

In step 301, a first offset corresponding to a state parameter of the UE and for determining whether a measurement triggering condition is met is determined according to a correspondence between state parameters and measurement offsets, after which step 302 is performed.

In step 302, the first measurement parameter is determined based on a second measurement parameter of the UE and the first offset, where the second measurement parameter is configured for the UE in idle mode or inactive mode by the network side, after which step 305 is performed.

In the above steps 301 and 302, the first offset is determined in a static manner, for example, selected or predefined based on the state of the UE.

In step 303, a first offset for determining whether a measurement triggering condition is met is determined based on state change information of the UE or based on an event determined by the UE, after which step 304 is performed.

In step 304, the first measurement parameter is determined based on a second measurement parameter of the UE and the first offset, where the second measurement parameter is configured for the UE in idle mode or inactive mode by the network side, after which step 305 is performed.

The second measurement parameter above includes any one or more of the following: an intra-frequency neighboring cell measurement starting threshold, or an inter-frequency or inter-RAT measurement starting threshold. The second measurement parameter in step 304 is configured for the UE in idle mode or inactive mode by the network side in a relevant way.

The first offset in steps 303 and 304 is determined in a dynamic manner. For example, the first offset is selected based on a state change of the UE or based on an event, where the event may be too late or too early cell re-selection, which is not limited herein.

In step 305, whether a measurement triggering condition is met is determined.

In some embodiments of the present disclosure, the measurement triggering condition above may be a relevant measurement triggering condition, which is not described in detail herein.

In step 306, measurement is performed on a neighboring cell of the UE based on the first measurement parameter in a case that the measurement triggering condition is met.

Optionally, in some embodiments of the present disclosure, the network side may enable or disable the UE a behavioral capability of determining the first measurement parameter based on the second measurement parameter of the UE and the first offset. In a case that the UE does not have a first behavioral capability of determining the first measurement parameter based on the second measurement parameter of the UE and the first offset, the UE performs measurement on the neighboring cell based on a measurement parameter configured by the network side.

In an embodiment, before step 302 or step 304, the method further includes: determining whether the UE has a first behavioral capability of determining the first measurement parameter based on the second measurement parameter of the UE and the first offset; performing the step of determining the first measurement parameter based on the second measurement parameter of the UE and the first offset, in a case that the UE has the first behavioral capability; and performing measurement on the neighboring cell of the UE based on the second measurement parameter, in a case that the UE does not have the first behavioral capability.

Further, in some embodiments of the present disclosure, the network side may enable or disable the first behavioral capability directly or based on a request from the UE.

In an embodiment, the UE obtains enable information or disable information of the first behavioral capability configured by the network side, where the enable information of the first behavioral capability indicates that the UE has the first behavioral capability, and the disable information of the first behavioral capability indicates that the UE does not have the first behavioral capability. For example, the enable information or the disable information, configured by the network side, of the first behavioral capability may be obtained via a broadcast message and/or a system message; or the enable information or the disable information, configured by the network side, of the first behavioral capability is obtained via a radio resource control (RRC) message.

In an embodiment, a request message for requesting the first behavioral capability is transmitted to the network side; and the enable information or the disable information of the first behavioral capability, transmitted by the network side based on the request message, is obtained, where the enable information of the first behavioral capability indicates that the UE has the first behavioral capability, and the disable information of the first behavioral capability indicates that the UE does not have the first behavioral capability.

In some embodiments of the present disclosure, the network side may explicitly broadcast whether the network side supports a condition of performing measurement triggering based on the state of the UE, or the network side may implicitly broadcast whether the network side supports the condition of performing measurement triggering based on the state of the UE. For example, the network side broadcasting the first offset is equivalent to that the network side implicitly broadcasts whether the network side supports the condition of performing measurement triggering based on the state of the UE.

Optionally, in some embodiments of the present disclosure, the method further includes: explicitly or implicitly obtaining a notification from the network side of whether the network side supports a second behavioral capability of performing measurement triggering based on the state of the UE.

Further, in a case of cell selection or re-selection, the method further includes: adding a second offset to a determination condition of S-criteria or R-criteria corresponding to a cell supporting the second behavioral capability, or increasing a priority of a cell supporting the second acting capability. For example, in a case that it is supported by a cell, an offset is added for S-criteria of cell selection, and an offset is added for R-criteria for cell re-selection in cell ranking; and in a case that it is supported by another frequency point, a priority of a frequency point supported by broadcast is increased in cell selection and re-selection. The above S-criteria and R-criteria refer to S-criteria and ranking criteria (R-criteria) in cell selection and re-selection process.

A reverse third offset is added to a determination condition of S-criteria or R-criteria corresponding to a cell that does not support the second behavioral capability, or a priority of a cell that does not support the second behavioral capability is decreased.

In some embodiments of the present disclosure, the first measurement parameter may be configured by the network side and selected by the UE based on the state of the UE, so that measurement may be triggered in different manners for the UE in different states, and further, measurement in power saving mode may be configured for the UE that is stationary or at a low mobility, thereby achieving the purpose of power saving.

Figure 4:
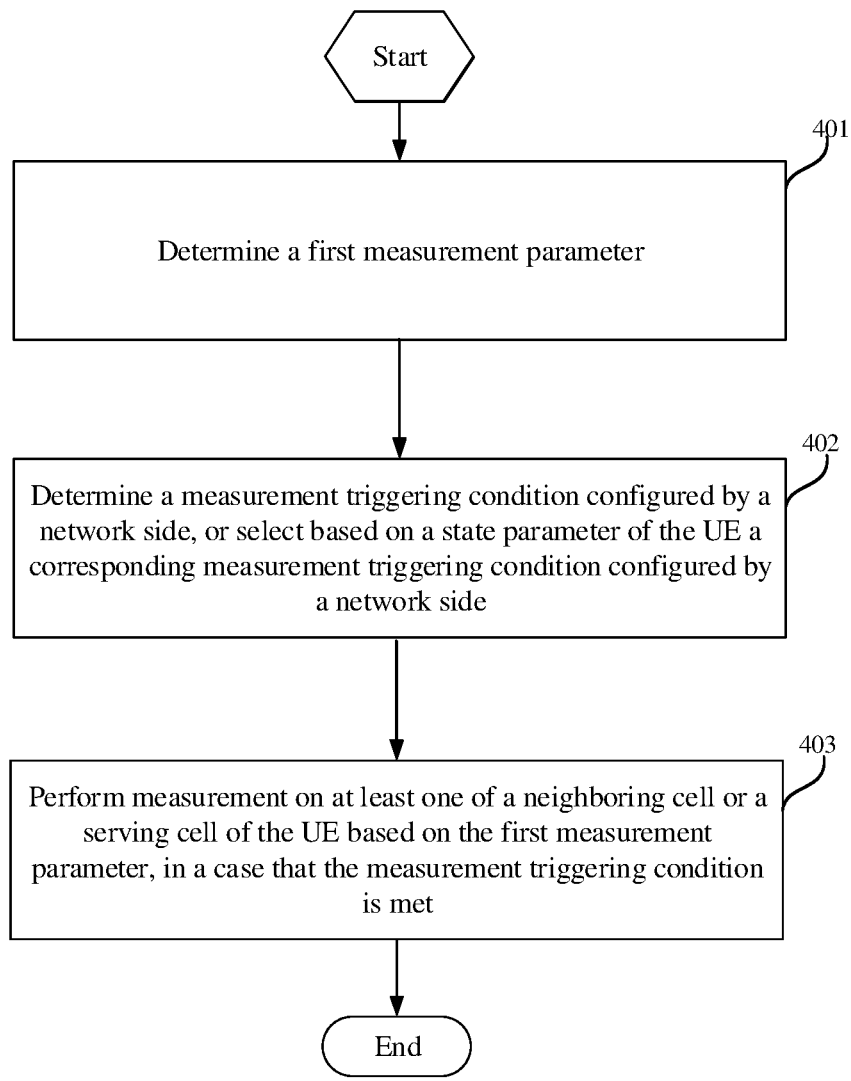
FIG. 4 is another flowchart of a measurement method on a user equipment side according to some embodiments of the present disclosure.

Referring to FIG. 4, FIG. 4 is a flowchart of a measurement method according to some embodiments of the present disclosure. The method is performed by a UE. In some embodiments of the present disclosure, a new measurement triggering condition is defined based on a different state of the UE. The method includes steps 401 to 403.

In step 401, a first measurement parameter is determined.

Optionally, a network side may configure a relevant measurement parameter for the UE in idle mode or inactive mode, which is not limited herein.

In step 402, a measurement triggering condition configured by the network side is obtained, or a corresponding measurement triggering condition configured by the network side is selected based on a state parameter of the UE.

In step 403, measurement on at least one of a neighboring cell or a serving cell of the UE is performed based on the first measurement parameter, in a case that the measurement triggering condition is met.

In some embodiments of the present disclosure, the measurement triggering condition includes any one of the following first to fifth conditions.

First condition: a signal quality of the neighboring cell is greater than a first preset threshold and/or a signal intensity of the neighboring cell is greater than a second preset threshold, where the first and second preset thresholds may be configured by the network side or determined in a predefined manner.

Second condition: a signal quality of the serving cell is smaller than a currently stored first signal quality by a third preset value and/or a signal intensity of the serving cell is smaller than a currently stored first signal intensity by a fourth preset value (for example, represented by XdB), where the third and fourth preset values may be configured by the network side or determined in a predefined manner.

Third condition: a signal quality of the neighboring cell is smaller than a currently stored second signal quality by a fifth preset value and/or a signal intensity of the neighboring cell is smaller than a currently stored second signal intensity by a sixth preset value (for example, represented by ZdB), where the fifth and sixth preset values may be configured by the network side or determined in a predefined manner.

Fourth condition: a signal quality of the neighboring cell is greater than a signal quality of the serving cell by a seventh preset value and/or a signal intensity of the neighboring cell is greater than a signal intensity of the serving cell by an eighth preset value (YdB), where the seventh and eighth preset values may be configured by the network side or determined in a predefined manner.

Fifth condition: any two, three or four of the first condition, the second condition, the third condition, the fourth condition, and a sixth condition are met concurrently.

The sixth condition includes that a signal quality of the serving cell is smaller than a ninth preset value and/or a signal intensity of the serving cell is smaller than a tenth preset value. The sixth condition is a relevant measurement triggering condition, which is not described herein.

In some embodiments of the present disclosure, the network side (for example, a base station) may directly configure a corresponding measurement triggering condition; or, the network side may configure available measurement triggering conditions, and the UE selects different measurement triggering conditions based on different states. In an embodiment, any one of the above first, second, third, fourth and fifth conditions is configured by the network side and/or selected by the UE based on the state parameter of the UE.

A user equipment is further provided according to some embodiments of the present disclosure. Reference may be made to the implementations of the method for implementations of the user equipment, as the user equipment solves the problem by a principle similar to that of the measurement method at the user equipment side according to some embodiments of the present disclosure, where the repeated parts are not described herein.

Figure 5:
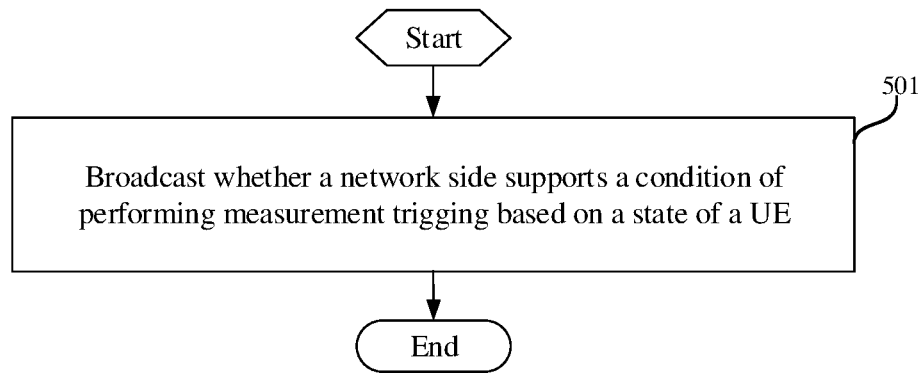
FIG. 5 is a flowchart of a measurement method on a network side according to some embodiments of the present disclosure.

Referring to FIG. 5, FIG. 5 is flowchart of a measurement method at a network side according to some embodiments of the present disclosure. The measurement method is performed by a network side device (for example, a base station) and includes step 501.

In step 501, whether the network side supports a condition of performing measurement triggering based on a state of a UE is broadcasted.

For example, the network side device explicitly broadcasts whether the network side supports the condition of performing measurement triggering based on the state of the UE, or the network side device implicitly broadcasts whether the network side supports the condition of performing measurement triggering based on the state of the UE. For example, the network side broadcasting a first measurement parameter is equivalent to that the network side implicitly broadcasts whether the network side supports the condition of performing measurement triggering based on the state of the UE. For example, the network side broadcasting a first offset is equivalent to that the network side implicitly broadcasts whether the network side supports the condition of performing measurement triggering based on the state of the UE.

In some embodiments of the present disclosure, the network side device may help the UE perform measurement based on the state of the UE, so that measurement may be triggered in different manners for the UE in different states, and further, measurement in power saving mode may be configured for the UE that is stationary or at a low mobility, thereby achieving the purpose of power saving.

A network side device is further provided according to some embodiments of the present disclosure. Reference may be made to the implementations of the method for implementations of the network side device, as the network side device solves the problem by a principle similar to that of the measurement method at the network side according to some embodiments of the present disclosure, where the repeated parts are not described again.

Figure 6:
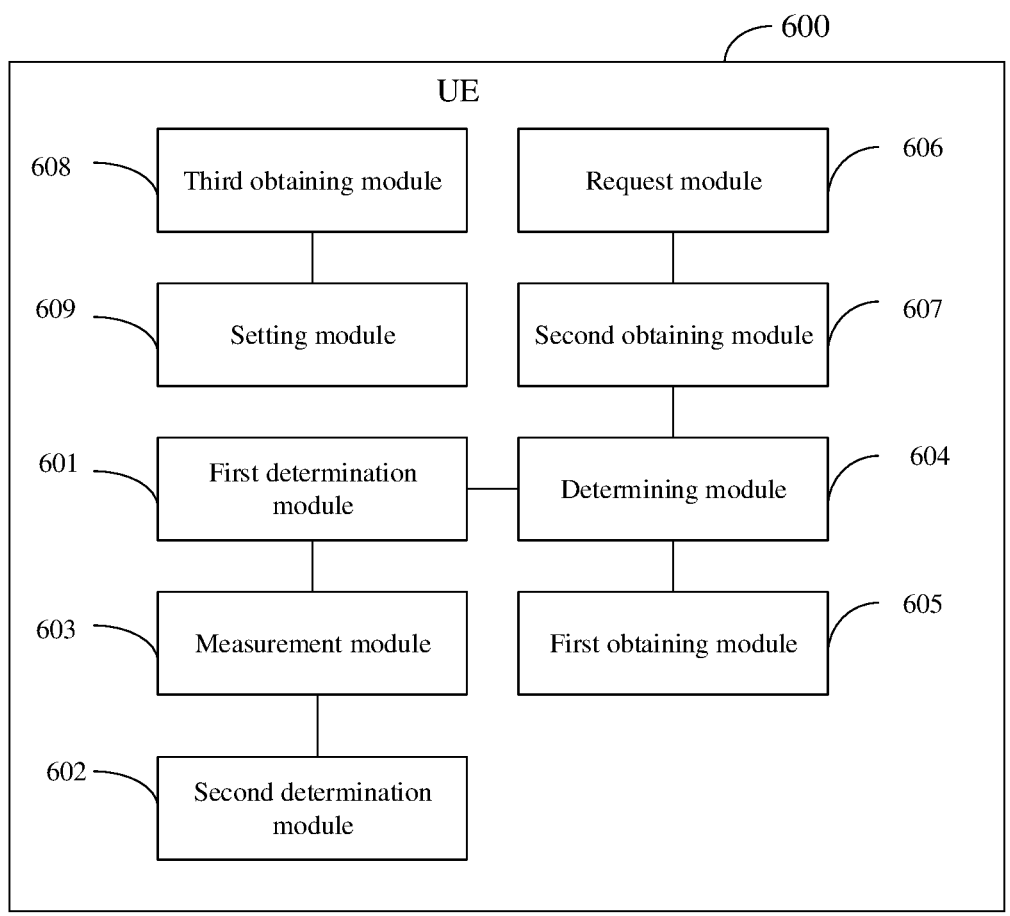
FIG. 6 is a structural block diagram of a user equipment according to some embodiments of the present disclosure.

Referring to FIG. 6, FIG. 6 shows a structural block diagram of a UE according to some embodiments of the present disclosure. The UE 600 includes a first determination module 601, a second determination module 602 and a measurement module 603.

The first determination module 601 is configured to determine a first measurement parameter.

The second determination module 602 is configured to determine whether a measurement triggering condition is met.

The measurement module 603 is configure to perform, in a case that the measurement triggering condition is met, measurement on at least one of a neighboring cell of the UE or a serving cell of the UE based on the first measurement parameter.

Optionally, the first determination module 601 is further configured to: determine the first measurement parameter corresponding to a state parameter of the UE based on a correspondence between state parameters and first measurement parameters; or determine the first measurement parameter based on state change information of the UE or based on an event determined by the UE.

Optionally, the first measurement parameter includes any one or more of the following: an intra-frequency neighboring cell measurement starting threshold, an inter-frequency or inter-RAT measurement starting threshold, or a first offset for determining whether the measurement triggering condition is met.

Optionally, the first measurement parameter is configured for the UE by a network side via a radio resource control (RRC) message or a system message.

Optionally, the first determination module 601 is further configured to: determine a first offset which is corresponding to a state parameter of the UE and is for determining whether the measurement triggering condition is met, according to a correspondence between state parameters and measurement offsets, and determine the first measurement parameter based on a second measurement parameter of the UE and the first offset, where the second measurement parameter is configured for the UE in an idle mode or an inactive mode by the network side; or determine a first offset for determining whether the measurement triggering condition is met based on the state change information of the UE or an event determined by the UE, and determine the first measurement parameter based on a second measurement parameter of the UE and the first offset, where the second measurement parameter is configured for the UE in an idle mode or an inactive mode by a network side.

Optionally, the second measurement parameter includes any one or more of the following: an intra-frequency neighboring cell measurement starting threshold, or an inter-frequency or inter-RAT measurement starting threshold.

Optionally, with reference to FIG. 6, the UE 600 further includes a determining module 604.

The determining module 604 is configured to: determine whether the UE has a first behavioral capability of determining the first measurement parameter based on the second measurement parameter of the UE and the first offset; instruct the first determination module 601 to determine the first measurement parameter based on the second measurement parameter of the UE and the first offset, in a case that the UE has the first behavioral capability; and perform measurement on the neighboring cell of the UE based on the second measurement parameter, in a case that the UE does not have the first behavioral capability.

Optionally, with reference to FIG. 6, the UE 600 further includes a first obtaining module 605.

The first obtaining module 605 is configured to obtain enable information or disable information of the first behavioral capability configured by the network side, where the enable information of the first behavioral capability indicates that the UE has the first behavioral capability, and the disable information of the first behavioral capability indicates that the UE does not have the first behavioral capability.

Optionally, the first obtaining module 605 is further configured to: obtain the enable information or the disable information of the first behavioral capability configured by the network side, via a broadcast message and/or a system message; or obtain the enable information or the disable information of the first behavioral capability configured by the network side, via a radio resource control (RRC) message.

Optionally, with reference to FIG. 6, the UE 600 further includes a request module 606 and a second obtaining module 607.

The request module 606 is configured to transmit a request message for requesting the first behavioral capability to the network side.

The second obtaining module 607 is configured to obtain the enable information or the disable information of the first behavioral capability, transmitted by the network side based on the request message, where the enable information of the first behavioral capability indicates that the UE has the first behavioral capability, and the disable information of the first behavioral capability indicates that the UE does not have the first behavioral capability.

Optionally, the state parameter of the UE includes any one or more of the following: a type of the UE, a movement of the UE, a maximum movement speed of the UE, a current mobility state of the UE, a current service state of the UE, a state of a network on which the UE currently camps, or a channel state of the UE.

Optionally, the measurement triggering condition includes any one of the following first to sixth conditions.

First condition: a signal quality of the neighboring cell is greater than a first preset threshold and/or a signal intensity of the neighboring cell is greater than a second preset threshold, where the first and second preset thresholds are configured by the network side or determined in a predefined manner.

Second condition: a signal quality of the serving cell is smaller than a currently stored first signal quality by a third preset value and/or a signal intensity of the serving cell is smaller than a currently stored first signal intensity by a fourth preset value, where the third and fourth preset values are configured by the network side or determined in a predefined manner.

Third condition: a signal quality of the neighboring cell is smaller than a currently stored second signal quality by a fifth preset value and/or a signal intensity of the neighboring cell is smaller than a currently stored second signal intensity by a sixth preset value, where the fifth and sixth preset values are configured by the network side or determined in a predefined manner.

Fourth condition: a signal quality of the neighboring cell is greater than a signal quality of the serving cell by a seventh preset value and/or a signal intensity of the neighboring cell is greater than a signal intensity of the serving cell by an eighth preset value, where the seventh and eighth preset values are configured by the network side or determined in a predefined manner.

Fifth condition: any two, three or four of the first condition, the second condition, the third condition, the fourth condition, and a sixth condition are met concurrently.

The sixth condition includes that a signal quality of the serving cell is smaller than a ninth preset value and/or a signal intensity of the serving cell is smaller than a tenth preset value.

Optionally, any one of the first, second, third, fourth and fifth conditions is configured by the network side and/or selected by the UE based on the state parameter of the UE.

Optionally, with reference to FIG. 6, the UE 600 further includes a third obtaining module 608.

The third obtaining module 608 is configured to explicitly or implicitly obtain a notification from the network side of whether the network side supports a second behavioral capability of performing measurement triggering based on a state of the UE.

Optionally, with reference to FIG. 6, the UE 600 further includes a setting module 609.

The setting module 609 is configured to, in a case of cell selection or re-selection, add a second offset to a determination condition of S-criteria or R-criteria corresponding to a cell supporting the second behavioral capability, or increase a priority of a cell supporting the second behavioral capability; and add a reverse third offset to a determination condition of S-criteria or R-criteria corresponding to a cell that does not support the second behavioral capability, or decrease a priority of a cell that does not support the second behavioral capability.

Optionally, the UE further includes a sensor module and a baseband processing module, where the sensor module transmits a state of the UE as collected, to the baseband processing module.

The user equipment according to some embodiments of the present disclosure can implement the method embodiments above, and the implementation principle and technical effects thereof are similar, which are not described herein.

A network side device is further provided according to some embodiments of the present disclosure. As the principle by which the network side device solves the problems is similar to that of the measurement method according to some embodiments of the present disclosure, reference can be made to implementations of the method for implementations of the network side device and repeated parts are not describe herein.

Figure 7:
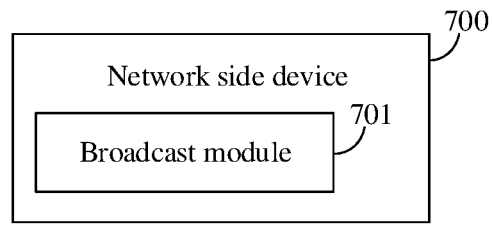
FIG. 7 is a structural block diagram of a network side device according to some embodiments of the present disclosure.

Referring to FIG. 7, FIG. 7 shows a structure of the network side device. The network side device 700 includes a broadcast module 701.

The broadcast module 701 is configured to broadcast whether a network side supports a condition of performing measurement triggering based on a state of a UE.

Optionally, the broadcast module 701 is further configured to: explicitly broadcast whether the network side supports the condition of performing measurement triggering based on the state of the UE; or implicitly broadcast whether the network side supports the condition of performing measurement triggering based on the state of the UE.

The network side device according to some embodiments of the present disclosure can implement the method embodiments above, and the implementation principle and technical effects thereof are similar, which are not described herein.

Figure 8:
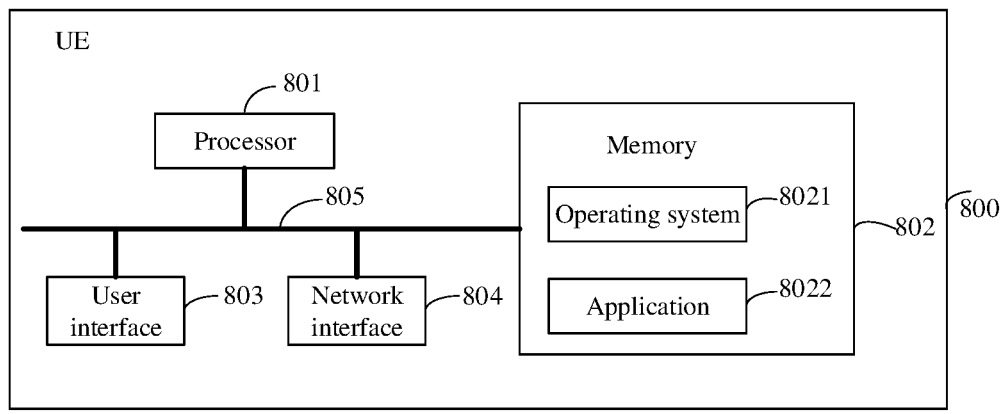
FIG. 8 is another structural block diagram of a user equipment according to some embodiments of the present disclosure.

FIG. 8 is a schematic structural diagram of a user equipment according to some embodiments of the present disclosure. As shown in FIG. 8, the user equipment 800 in FIG. 8 includes: a sensor (not shown), at least one processor 801, a memory 802, at least one network interface 804 and a user interface 803. Various components of the user equipment 800 are coupled to each other by a bus system 805. It can be understood that the bus system 805 is configured to implement connection and communication between the components. In addition to a data bus, the bus system 805 includes a power supply bus, a control bus and a state signal bus. For purpose of clarity, various buses are designated as the bus system 805 in FIG. 8.

The sensor transmits the state of the UE as collected, to the processor 801.

The user interface 803 may include a display, a keyboard or a click device (such as, a mouse or a trackball), a touchpad or a touch screen, etc.

It can be understood that the memory 802 in some embodiments of the present disclosure may be a volatile memory or a non-volatile memory, or may include both volatile and non-volatile memories. The non-volatile memory may be a read-only memory (ROM), a programmable read-only memory (Programmable ROM, PROM), an erasable programmable read-only memory (Erasable PROM, EPROM), or an electrically erasable programmable read-only memory (Electrically EPROM, EEPROM) or a flash memory. The volatile memory may be a random access memory (RAM) that acts as a high-speed external cache. By way of example and not limitation, various kinds of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SDRAM) and a direct rambus random access memory (Direct Rambus RAM, DRRAM). The memory 802 in the systems and methods described in some embodiments of the present disclosure is intended to include, without being limited to, these and any other suitable types of memories.

In some implementations, the memory 802 stores following elements, executable modules or data structures, or a subset thereof, or an extended set thereof: an operating system 8021 and an application 8022.

The operating system 8021 includes various system programs, such as a framework layer, a core library layer and a driver layer, to implement various fundamental services and process hardware-based tasks. The application 8022 includes various applications, such as a media player and a browser, for implementing various application services. A program implementing the method in some embodiments of the present disclosure may be included in the application 8022.

In some embodiments of the present disclosure, by calling and executing a program or instructions stored in the memory 802, which may be a program or instructions stored in the application 8022, the processor 801 performs the following steps: determining a first measurement parameter and whether a measurement triggering condition is met; and performing measurement on a neighboring cell and/or a serving cell of the UE based on the first measurement parameter, in a case that the measurement triggering condition is met.

The methods according to the foregoing embodiments of the present disclosure may be applied to the processor 801, or implemented by the processor 801. The processor 801 may be an integrated circuit chip with signal processing capabilities. In implementation, each step of the foregoing methods may be completed by an integrated logic circuit in form of hardware in the processor 801 or instructions in form of software. The processor 801 above may be a general-purpose processor, a digital signal processor (DSP), an application specific integrated circuit (ASIC), a field programmable gate array (FPGA) or any other programmable logic device, a discrete gate, a transistor logic device or a discrete hardware component, which can implement or carry out the methods, steps, and logical block diagrams according to the embodiments of the present disclosure. The general-purpose processor may be a microprocessor, or the processor may be any conventional processor or the like. The steps of the methods according to the embodiments of the present disclosure may be directly implemented by a hardware decoding processor, or may be performed by a combination of hardware and software modules in the decoding processor. The software module may be located in a conventional well-developed storage medium such as a random access memory, a flash memory, a read-only memory, a programmable read-only memory, an electrically erasable programmable memory, a register, or the like. The storage medium is located in the memory 802, and the processor 801 reads the information in the memory 802 and completes the steps of the above methods in combination with its hardware.

It can be understood that the embodiments described herein may be implemented in hardware, software, firmware, middleware, microcode, or a combination thereof. For hardware implementation, the processing unit may be implemented in one or at least two application specific integrated circuits (ASIC), digital signal processors (DSP), digital signal processing devices (DSP Device, DSPD), programmable logic devices (Programmable Logic Device, PLD), field-programmable gate arrays (FPGA), general purpose processors, controllers, microcontrollers, microprocessors, other electronics units for performing the functions according to the present disclosure or a combination thereof.

For software implementation, the technical solutions according to the present disclosure may be implemented by modules (e.g., processes, functions, and so on) for performing the functions according to the present disclosure. Software codes may be stored in a memory and executed by a processor. The memory may be implemented in the processor or external to the processor.

Optionally, the processor 801 further performs the following steps by executing the measurement program:
  determining the first measurement parameter corresponding to a state parameter of the UE based on a correspondence between state parameters and first measurement parameters; or
  determining the first measurement parameter based on state change information of the UE or based on an event determined by the UE.

Optionally, the processor 801 further performs the following steps by executing the measurement program:
  determining a first offset which is corresponding to a state parameter of the UE and is for determining whether the measurement triggering condition is met, according to a correspondence between state parameters and measurement offsets, and determining the first measurement parameter based on a second measurement parameter of the UE and the first offset, where the second measurement parameter is configured for the UE in an idle mode or an inactive mode by a network side; or
  determining a first offset for determining whether the measurement triggering condition is met based on state change information of the UE or an event determined by the UE, and determining the first measurement parameter based on a second measurement parameter of the UE and the first offset, where the second measurement parameter is configured for the UE in an idle mode or an inactive mode by a network side.

Optionally, the processor 801 further performs the following steps by executing the measurement program:
  determining whether the UE has a first behavioral capability of determining the first measurement parameter based on the second measurement parameter of the UE and the first offset;
  performing the step of determining the first measurement parameter based on the second measurement parameter of the UE and the first offset, in a case that the UE has the first behavioral capability; and
  performing measurement on the neighboring cell of the UE based on the second measurement parameter, in a case that the UE does not have the first behavioral capability.

Optionally, the processor 801 further performs the following steps by executing the measurement program:
  obtaining enable information or disable information of the first behavioral capability configured by the network side, where the enable information of the first behavioral capability indicates that the UE has the first behavioral capability, and the disable information of the first behavioral capability indicates that the UE does not have the first behavioral capability.

Optionally, the processor 801 further performs the following steps by executing the measurement program:
  obtaining the enable information or the disable information of the first behavioral capability configured by the network side, via at least one of a broadcast message or a system message; or
  obtaining the enable information or the disable information of the first behavioral capability configured by the network side, via a radio resource control (RRC) message.

Optionally, the processor 801 further performs the following steps by executing the measurement program:
  transmitting a request message for requesting the first behavioral capability to the network side; and
  obtaining the enable information or the disable information of the first behavioral capability, transmitted by the network side based on the request message, where the enable information of the first behavioral capability indicates that the UE has the first behavioral capability, and the disable information of the first behavioral capability indicates that the UE does not have the first behavioral capability.

Optionally, the processor 801 further performs the following steps by executing the measurement program:
  obtaining, in an explicit manner or in an implicit manner, a notification from the network side of whether the network side supports a second behavioral capability of performing measurement triggering based on the state of the UE.

Optionally, the processor 801 further performs the following steps by executing the measurement program:
  adding a second offset to a determination condition of S-criteria or R-criteria corresponding to a cell supporting the second behavioral capability, or increasing a priority of a cell supporting the second behavioral capability; and
adding a reverse third offset to a determination condition of S-criteria or R-criteria corresponding to a cell that does not support the second behavioral capability, or reducing a priority of a cell that does not support the second behavioral capability.

Figure 9:
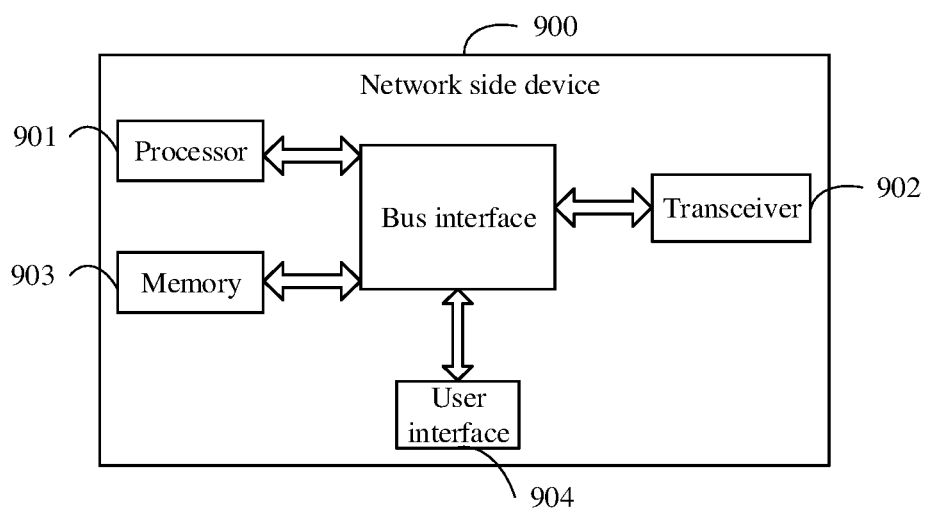
FIG. 9 is another structural block diagram of a network side device according to some embodiments of the present disclosure.

Referring FIG. 9, FIG. 9 is a structural diagram of a network side device according to some embodiments of the present disclosure. The network side device can perform details of the measurement method at the network side device according to the foregoing embodiments and achieve the same effects. As shown in FIG. 9, the network side device 900 includes: a processor 901, a transceiver 902, a memory 903, a user interface 904 and a bus interface.

In some embodiments of the present disclosure, the network side device 900 further includes a measurement program stored on the memory 903 and executable by the processor 901, and the processor 901 performs the following step by executing the measurement program: broadcasting whether a network side supports a condition of performing measurement triggering based on a state of a UE.

A bus architecture in FIG. 9 may include any quantity of interconnected buses and bridges. Various circuits including one or at least two processors represented by the processor 901 and a memory represented by the memory 903 are coupled together. The bus architecture may also couple various other circuits such as a peripheral component, a voltage regulator, and a power management circuit, which are well known in the art and thus are not further described herein. A bus interface provides an interface. The transceiver 902 may be at least two elements, i.e., including a transmitter and a receiver, which provides a unit for communicating with various other devices on a transmission medium. For different user devices, the user interface 904 may be an interface capable of connecting needed external or internal devices. The connected devices include, but not limited to, a keypad, a display, a speaker, a microphone, a joystick, and the like.

The processor 901 is in charge of managing the bus architecture and common processes, and the memory 903 may be configured to store data used by the processor 901 in performing operations.

Optionally, the processor 901 further performs the following steps by executing the measurement program:
  explicitly broadcasting whether the network side supports the condition of performing measurement triggering based on the state of the UE; or
  implicitly broadcasting whether the network side supports the condition of performing measurement triggering based on the state of the UE.

A computer readable storage medium is further provided according to some embodiments of the present disclosure, the computer readable storage medium including a measurement program stored thereon, and when the measurement program is executed by a processor, the steps of the measurement method above on the user equipment side, or the steps of the measurement method above on the network side are performed by the processor.

The computer readable storage medium according to the present disclosure may be volatile or non-volatile.

Those skilled in the art will appreciate that the modules or the units or the algorithm steps (for example, various modules or units in the user equipment shown in FIG. 6, or various modules or units in the network side device shown in FIG. 7) described in conjunction with the embodiments according to the present disclosure may be implemented in the form of electronic hardware or a combination of computer software and electronic hardware. Whether these functions are performed in hardware or software depends on the specific application and design constraints of the solution. Those skilled in the art may use different methods to implement the described functions for each particular application, and such implementations are not to be considered as departing from the scope of the present disclosure.

Those skilled in the art can clearly understand that, for the sake of easiness and conciseness of description, reference can be made to the corresponding processes in the foregoing method embodiments for specific operating processes of the systems, the devices and the units described above, and a repeated description thereof is omitted herein.

It should be understood that in the embodiments according to the present application, the disclosed method and device may be implemented in other ways. For example, the described embodiments directed to the device are merely exemplary. For example, the units are divided merely in logical function, which may be divided in another way in actual implementation, e.g., at least two units or components may be combined or integrated into another system, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separate components may or may not be physically separated, and the components shown as units may or may not be physical units, that is, they may be located in one place or distributed over at least two network units. Some or all of the units may be selected according to practical needs to achieve the object of the technical solutions of the embodiments of the present disclosure.

In addition, functional units in various embodiments of the present disclosure may be integrated into one processing unit, or may be physically independent, or two or more units may be integrated into one unit.

If the functions are implemented in the form of a software functional unit, and sold or used as a standalone product, the unit may be stored in a computer readable storage medium. Based on this understanding, essence of the technical solution of the present disclosure, or the part contributing to the related technologies, or part of the technical solution, can be embodied in the form of a software product. The computer software product is stored in a storage media, and the computer software product includes a number of instructions to enable a computer device (which may be a personal computer, a server, or a network device, etc.) to perform all or part of the steps of the method described in the various embodiments of the present disclosure. The storage medium includes a USB flash disk, a mobile hard disk, a read-only memory (ROM), a random access memory (RAM), a magnetic disk, an optical disk, and other medium which can store program code.

The aforementioned are merely specific implementations of the present disclosure, and the protection scope of the present disclosure is not limited thereto. Any modifications or replacements that would easily occur to those skilled in the art, without departing from the technical scope disclosed in the present disclosure, should be encompassed in the protection scope of the present disclosure. Therefore, the protection scope of the present disclosure is to be determined by the protection scope of the claims.

What is claimed is:

1. A measurement method, applied to a user equipment (UE), comprising:
  determining a first measurement parameter;
  determining whether a measurement triggering condition is met; and
  performing measurement on at least one of a neighboring cell of the UE or a serving cell of the UE based on the first measurement parameter, in a case that the measurement triggering condition is met,
  wherein the determining the first measurement parameter comprises:
  determining the first measurement parameter corresponding to a state parameter of the UE based on a correspondence between state parameters and first measurement parameters;
  wherein the first measurement parameter comprises any one or more of the following:
  an intra-frequency neighboring cell measurement starting threshold, an inter-frequency or inter-RAT measurement starting threshold, or a first offset for determining whether the measurement triggering condition is met;
  wherein the determining the first measurement parameter further comprises:
  determining, according to a correspondence between state parameters and measurement offsets, a first offset which is corresponding to the state parameter of the UE and is for determining whether the measurement triggering condition is met; and determining the first measurement parameter based on a second measurement parameter of the UE and the first offset, wherein the second measurement parameter is configured for the UE in an idle mode or an inactive mode by a network side;

wherein the method further comprises:

determining whether the UE has a first behavioral capability of determining the first measurement parameter based on the second measurement parameter of the UE and the first offset;

performing the step of determining the first measurement parameter based on the second measurement parameter of the UE and the first offset, in a case that the UE has the first behavioral capability; and performing measurement on the neighboring cell of the UE based on the second measurement parameter, in a case that the UE does not have the first behavioral capability.

2. The method according to claim 1, wherein the second measurement parameter comprises any one or more of the following:

an intra-frequency neighboring cell measurement starting threshold, or an inter-frequency or inter-RAT measurement starting threshold.

3. The method according to claim 1, wherein before the step of determining whether the UE has the first behavioral capability of determining the first measurement parameter based on the second measurement parameter of the UE and the first offset, the method further comprises:

obtaining enable information or disable information of the first behavioral capability configured by the network side, wherein the enable information of the first behavioral capability indicates that the UE has the first behavioral capability, and the disable information of the first behavioral capability indicates that the UE does not have the first behavioral capability.

4. The method according to claim 3, wherein the obtaining the enable information or the disable information of the first behavioral capability configured by the network side comprises:

obtaining the enable information or the disable information of the first behavioral capability configured by the network side, via at least one of a broadcast message or a system message; or obtaining the enable information or the disable information of the first behavioral capability configured by the network side, via a radio resource control (RRC) message.

5. The method according to claim 1, wherein before the step of determining whether the UE has the first behavioral capability of determining the first measurement parameter based on the second measurement parameter of the UE and the first offset, the method further comprises:

transmitting a request message for requesting the first behavioral capability to the network side; and obtaining enable information or disable information of the first behavioral capability, transmitted by the network side based on the request message, wherein the enable information of the first behavioral capability indicates that the UE has the first behavioral capability, and the disable information of the first behavioral capability indicates that the UE does not have the first behavioral capability.

6. The method according to claim 1, wherein the measurement triggering condition comprises any one of the following:

a first condition: a signal quality of the neighboring cell is greater than a first preset threshold and/or a signal intensity of the neighboring cell is greater than a second preset threshold, wherein the first preset threshold and the second preset threshold are configured by a network side or determined in a predefined manner;

a second condition: a signal quality of the serving cell is smaller than a currently stored first signal quality by a third preset value and/or a signal intensity of the serving cell is smaller than a currently stored first signal intensity by a fourth preset value, wherein the third preset value and the fourth preset value are configured by a network side or determined in a predefined manner;

a third condition: a signal quality of the neighboring cell is smaller than a currently stored second signal quality by a fifth preset value and/or a signal intensity of the neighboring cell is smaller than a currently stored second signal intensity by a sixth preset value, wherein the fifth preset value and the sixth preset value are configured by a network side or determined in a predefined manner;

a fourth condition: a signal quality of the neighboring cell is greater than the signal quality of the serving cell by a seventh preset value and/or a signal intensity of the neighboring cell is greater than the signal intensity of the serving cell by an eighth preset value, wherein the seventh preset value and the eighth preset value are configured by a network side or determined in a predefined manner;

a fifth condition: any two, three or four of the first condition, the second condition, the third condition, the fourth condition and a sixth condition are met concurrently;

wherein the sixth condition comprises that a signal quality of the serving cell is smaller than a ninth preset value and/or a signal intensity of the serving cell is smaller than a tenth preset value.

7. The method according to claim 1, further comprising:

obtaining, in an explicit manner or in an implicit manner, a notification from a network side of whether the network side supports a second behavioral capability of performing measurement triggering based on a state of the UE;

wherein in a case of cell selection or re-selection, the method further comprises:

adding a second offset to a determination condition of S-criteria or R-criteria corresponding to a cell supporting the second behavioral capability, or increasing a priority of a cell supporting the second behavioral capability; and adding a reverse third offset to a determination condition of S-criteria or R-criteria corresponding to a cell that does not support the second behavioral capability, or decreasing a priority of a cell that does not support the second behavioral capability.

8. A user equipment (UE), comprising a processor, a memory and a program stored on the memory and executable by the processor, wherein, when the program is executed by the processor, the processor is configured to:

determine a first measurement parameter;

determine whether a measurement triggering condition is met; and perform, in a case that the measurement triggering condition is met, measurement on at least one of a neighboring cell of the UE or a serving cell of the UE based on the first measurement parameter, wherein in determining the first measurement parameter, the processor is specifically configured to:

determine the first measurement parameter corresponding to a state parameter of the UE based on a correspondence between state parameters and first measurement parameters;

wherein the first measurement parameter comprises any one or more of the following:

an intra-frequency neighboring cell measurement starting threshold, an inter-frequency or inter-RAT measurement starting threshold, or a first offset for determining whether the measurement triggering condition is met;

wherein the processor is further configured to:

determine, according to a correspondence between state parameters and measurement offsets, a first offset which is corresponding to the state parameter of the UE and is for determining whether the measurement triggering condition is met; and determine the first measurement parameter based on a second measurement parameter of the UE and the first offset, wherein the second measurement parameter is configured for the UE in an idle mode or an inactive mode by a network side;

wherein the processor is further configured to:

determine whether the UE has a first behavioral capability of determining the first measurement parameter based on the second measurement parameter of the UE and the first offset;

determine the first measurement parameter based on the second measurement parameter of the UE and the first offset, in a case that the UE has the first behavioral capability; and perform measurement on the neighboring cell of the UE based on the second measurement parameter, in a case that the UE does not have the first behavioral capability.

9. The UE according to claim 8, wherein the processor is further configured to:

obtain enable information or disable information of the first behavioral capability configured by the network side, wherein the enable information of the first behavioral capability indicates that the UE has the first behavioral capability, and the disable information of the first behavioral capability indicates that the UE does not have the first behavioral capability.

10. The UE according to claim 9, wherein the processor is further configured to:

obtain the enable information or the disable information of the first behavioral capability configured by the network side, via at least one of a broadcast message or a system message; or obtain the enable information or the disable information of the first behavioral capability configured by the network side, via a radio resource control (RRC) message.

11. The UE according to claim 8, wherein the processor is further configured to:

transmit a request message for requesting the first behavioral capability to the network side; and obtain enable information or disable information of the first behavioral capability, transmitted by the network side based on the request message, wherein the enable information of the first behavioral capability indicates that the UE has the first behavioral capability, and the disable information of the first behavioral capability indicates that the UE does not have the first behavioral capability.

12. A non-transitory computer readable storage medium, comprising:

a program stored on the computer readable storage medium, wherein the program, when executed by a processor, causes the processor to perform following steps:

determining a first measurement parameter;

determining whether a measurement triggering condition is met; and performing measurement on at least one of a neighboring cell of the UE or a serving cell of the UE based on the first measurement parameter, in a case that the measurement triggering condition is met, wherein the determining the first measurement parameter comprises:

determining the first measurement parameter corresponding to a state parameter of the UE based on a correspondence between state parameters and first measurement parameters;

wherein the first measurement parameter comprises any one or more of the following:

an intra-frequency neighboring cell measurement starting threshold, an inter-frequency or inter-RAT measurement starting threshold, or a first offset for determining whether the measurement triggering condition is met;

wherein the determining the first measurement parameter further comprises:

determining, according to a correspondence between state parameters and measurement offsets, a first offset which is corresponding to the state parameter of the UE and is for determining whether the measurement triggering condition is met; and determining the first measurement parameter based on a second measurement parameter of the UE and the first offset, wherein the second measurement parameter is configured for the UE in an idle mode or an inactive mode by a network side;

wherein the program, when executed by a processor, causes the processor to further perform following steps:

determining whether the UE has a first behavioral capability of determining the first measurement parameter based on the second measurement parameter of the UE and the first offset;

performing the step of determining the first measurement parameter based on the second measurement parameter of the UE and the first offset, in a case that the UE has the first behavioral capability; and performing measurement on the neighboring cell of the UE based on the second measurement parameter, in a case that the UE does not have the first behavioral capability.

* * * * *